US012725979B2

(12) United States Patent
Kaneko

(10) Patent No.: US 12,725,979 B2
(45) Date of Patent: Sep. 1, 2026

(54) ELECTRICAL CONNECTOR

(71) Applicant: I-PEX Inc., Kyoto (JP)

(72) Inventor: Hirotake Kaneko, Ogori-city (JP)

(*) Notice: Subject to any disclaimer, the term of this patent is extended or adjusted under 35 U.S.C. 154(b) by 352 days.

(21) Appl. No.: 18/429,560

(22) Filed: Feb. 1, 2024

(65) Prior Publication Data

US 2024/0170894 A1 May 23, 2024

Related U.S. Application Data

(63) Continuation of application No. PCT/JP2022/028245, filed on Jul. 20, 2022.

(30) Foreign Application Priority Data

Aug. 6, 2021 (JP) ................................ 2021-129534

(51) Int. Cl.
*H01R 13/6471* (2011.01)
*H01R 12/79* (2011.01)
(Continued)

(52) U.S. Cl.
CPC ......... *H01R 13/6471* (2013.01); *H01R 12/79* (2013.01); *H01R 13/502* (2013.01); *H01R 13/6581* (2013.01)

(58) Field of Classification Search
CPC ........... H01R 13/6471; H01R 13/6581; H01R 13/502; H01R 12/79
(Continued)

(56) References Cited

U.S. PATENT DOCUMENTS 6,749,458 B1 * 6/2004 Kuo .................... H01R 12/774 439/484
7,094,092 B2 * 8/2006 Yang ................. H01R 13/6593 439/495
(Continued)

FOREIGN PATENT DOCUMENTS

JP 2018-129287 8/2018
JP 2019-009037 1/2019
(Continued)

OTHER PUBLICATIONS

International Search Report dated Oct. 11, 2022 for PCT/JP2022/028245.
(Continued)

*Primary Examiner* — Harshad C Patel
(74) *Attorney, Agent, or Firm* — SHIPWAY IP

(57) ABSTRACT

A connector includes: a plurality of signal contacts aligned along an arrangement orientation, each of the plurality of signal contacts extending along an extending orientation crossing the arrangement orientation and including: a connecting portion configured to be connected to a signal conductor of a coaxial cable; and a contacting portion extending from the connecting portion along the extending orientation and configured to contact a mate signal contact of a mate connector; a conductive ground contact extending along the extending orientation and including: a ground connecting portion configured to be connected to an outer conductor of the coaxial cable; and a ground contacting portion extending from the ground connecting portion along the extending orientation and configured to contact a mate ground contact of the mate connector; an insulating housing holding the plurality of signal contacts and the ground contact; and a conductive shell covering at least a portion of the insulating housing around the extending orientation, wherein the shell includes a projecting portion being in
(Continued)

contact with the ground contact, and wherein the projecting portion and the ground contact form a wall extending along the extending orientation between two adjacent signal contacts of the plurality of signal contacts.

20 Claims, 9 Drawing Sheets

(51) Int. Cl.
*H01R 13/502* (2006.01)
*H01R 13/6581* (2011.01)

(58) Field of Classification Search
USPC .......................................................... 439/578
See application file for complete search history.

(56) References Cited

U.S. PATENT DOCUMENTS

| | | | | | |
|---|---|---|---|---|---|
| 7,189,090 | B2 * | 3/2007 | Aizawa | H01R 12/62 | 439/495 |
| 8,075,324 | B2 * | 12/2011 | Yamaji | H01R 12/79 | 439/372 |
| 8,469,738 | B2 * | 6/2013 | Long | H01R 13/658 | 439/541.5 |
| 8,727,803 | B2 * | 5/2014 | Kurachi | H01R 13/639 | 439/497 |
| 8,858,254 | B2 * | 10/2014 | Ikari | H01R 43/16 | 439/492 |
| 9,509,067 | B2 * | 11/2016 | Yamauchi | H01R 9/0518 | |
| 10,992,072 | B2 * | 4/2021 | Shimada | H01R 12/775 | |
| 11,038,296 | B2 * | 6/2021 | Shimada | H01R 13/639 | |
| 11,569,620 | B2 * | 1/2023 | Masunaga | H01R 12/79 | |
| 2011/0280520 | A1 * | 11/2011 | Shimotsu | G02B 6/4201 | 385/76 |
| 2012/0058679 | A1 | 3/2012 | Ikari et al. | | |
| 2013/0270000 | A1 | 10/2013 | Buck et al. | | |
| 2019/0089095 | A1 * | 3/2019 | Toda | H01R 13/6474 | |
| 2020/0076132 | A1 * | 3/2020 | Yang | H01R 12/73 | |
| 2020/0212633 | A1 * | 7/2020 | Masunaga | H01R 12/79 | |
| 2021/0305740 | A1 | 9/2021 | Mongold et al. | | |

FOREIGN PATENT DOCUMENTS

| | | |
|---|---|---|
| JP | 2019-175566 | 10/2019 |
| JP | 2021-096960 | 6/2021 |
| TW | I445255 | 7/2014 |
| TW | 202023124 | 6/2020 |

OTHER PUBLICATIONS

International Preliminary Report on Patentability with Written Opinion dated Feb. 15, 2024 for PCT/JP2022/028245.

* cited by examiner

ELECTRICAL CONNECTOR

CROSS-REFERENCE TO RELATED APPLICATIONS

This application is a continuation application of PCT Application No. PCT/JP2022/028245, filed on Jul. 20, 2022, which claims the benefit of priority from Japanese Patent Application No. 2021-129534, filed on Aug. 6, 2021. The entire contents of the above listed PCT and priority applications are incorporated herein by reference.

BACKGROUND

Field

The present disclosure relates to a connector.

Description of the Related Art

Japanese Unexamined Patent Publication No. 2019-175566 discloses a configuration in which, in an electrical connector having contacts connected to a board and arranged in a row, a conductive wall is provided at a portion partitioning the contacts for each signal to be transmitted for preventing an increase in crosstalk due to resonance.

SUMMARY

Disclosed herein is a connector. The connector may include: a plurality of signal contacts aligned along an arrangement orientation, each of the plurality of signal contacts extending along an extending orientation crossing the arrangement orientation and including: a connecting portion configured to be connected to a signal conductor of a coaxial cable; and a contacting portion extending from the connecting portion along the extending orientation and configured to contact a mate signal contact of a mate connector; a conductive ground contact extending along the extending orientation and including: a ground connecting portion configured to be connected to an outer conductor of the coaxial cable; and a ground contacting portion extending from the ground connecting portion along the extending orientation and configured to contact a mate ground contact of the mate connector; an insulating housing holding the plurality of signal contacts and the ground contact; and a conductive shell covering at least a portion of the insulating housing around the extending orientation, wherein the shell includes a projecting portion being in contact with the ground contact, and wherein the projecting portion and the ground contact form a wall extending along the extending orientation between two adjacent signal contacts of the plurality of signal contacts.

DETAILED DESCRIPTION

In the following description, with reference to the drawings, the same reference numbers are assigned to the same components or to similar components having the same function, and overlapping description is omitted.

Outline of Connector Device

Figure 1:
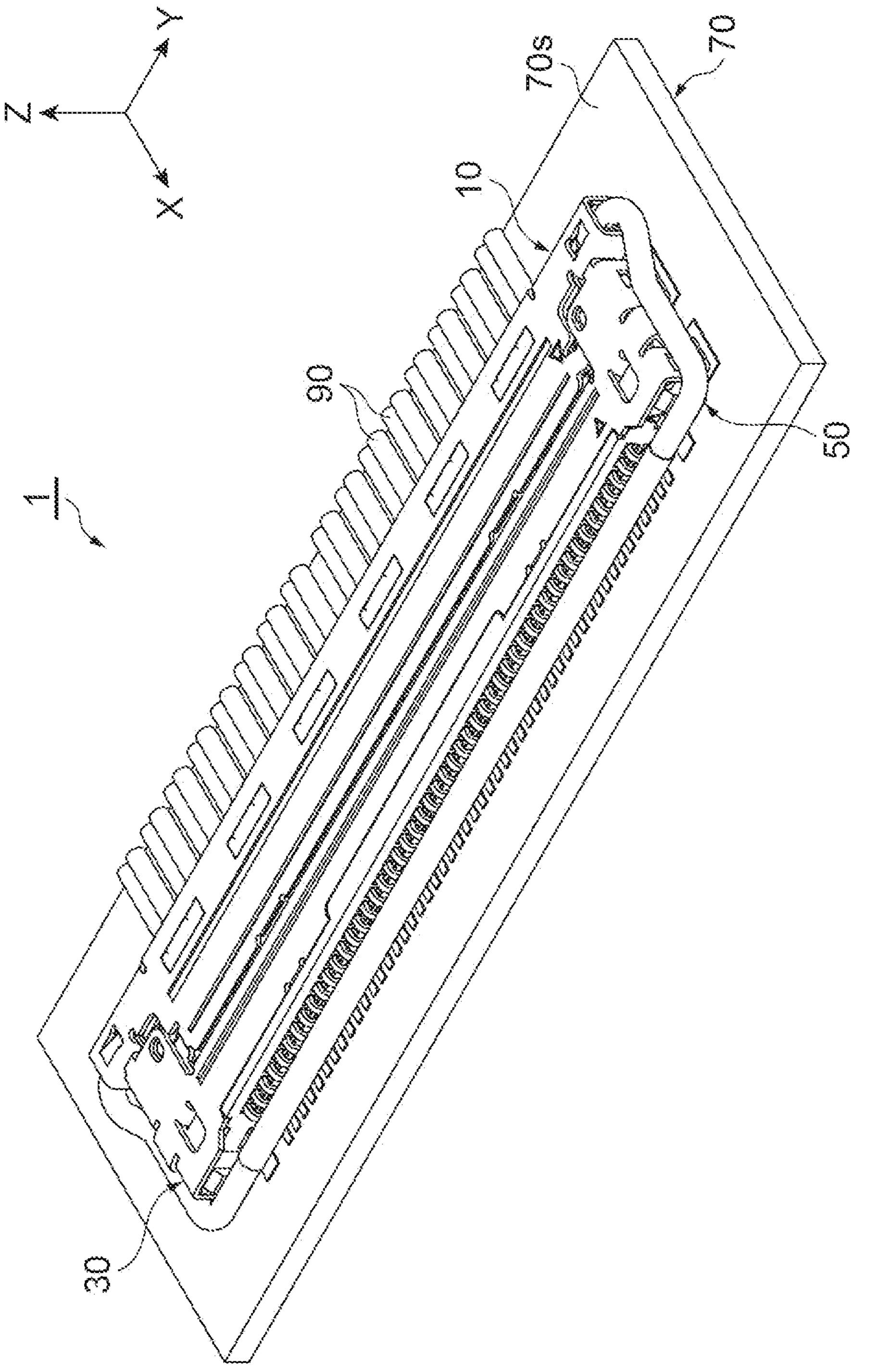
FIG. 1 is a perspective view illustrating an example connector device.

An outline of the connector device will be described with reference to FIG. 1. As illustrated in FIG. 1, a connector device 1, which is a type of electrical connector, includes a plug connector 10 and a receptacle connector 30 (mate connector). The plug connector 10 further includes a lock member 50 that maintains fitted state of the plug connector 10 and the receptacle connector 30.

The plug connector 10 is attached to the end of a coaxial cable 90 and is electrically connected to the coaxial cable 90. The receptacle connector 30 is mounted on a circuit board 70 and electrically connected to the circuit board 70.

The plug connector 10 and the receptacle connector 30 are configured to be able to be fitted to and removed from each other along one orientation (for example, an X-axis orientation) extending along a main surface 70*s* (for example, an XY plane) of the circuit board 70. The lock member 50 is configured to maintain a fitted state in which the plug connector 10 and the receptacle connector 30 fit together. In the fitted state of the plug connector 10 and the receptacle connector 30, the conductive path (for example, wiring, and is not illustrated) formed on the main surface 70*s* of the circuit board 70 is electrically connected to the coaxial cable 90. Thus, the connector device 1 is a device for electrically and physically connecting the conductive path and the electrical cable.

The circuit board 70 is a board on which electronic circuits and electronic components are mounted, and is, for example, a printed wiring board or a flexible printed board. The receptacle connector 30 is mounted on the main surface 70*s* of the circuit board 70 by solder connection or the like.

A plurality of coaxial cables 90 are wires used to transmit signals and the like between various circuit boards incorporated in electronic devices such as servers. The coaxial cables 90 extend along one orientation (for example, the X-axis orientation) in the fitted state of the plug connector 10 and the receptacle connector 30.

In the connector device 1, a plurality of pairs of the coaxial cables 90, which are pairs of two coaxial cables 90, are arranged side by side in the longitudinal orientation (a Y-axis orientation) of the plug connector 10. The pair of coaxial cables 90 is formed by two coaxial cables 90 arranged side by side in the longitudinal orientation of the plug connector 10. The pair of coaxial cables 90 transmits a differential signal. The pair of coaxial cables 90 is arranged at a predetermined interval set in advance along the longitudinal orientation of the plug connector 10.

Figure 4A:
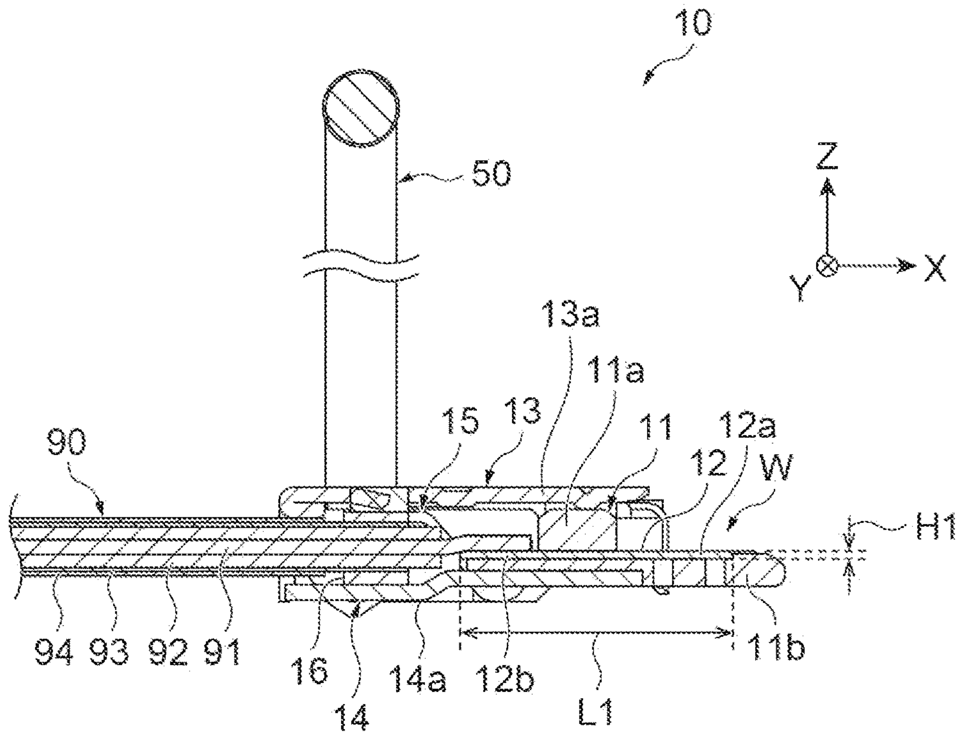
FIG. 4A is a IVA-IVA arrow view of the plug connector illustrated in FIG. 3A.

The coaxial cable 90 includes an inner conductor 91 made of a metallic wire (for example, a copper wire) extending linearly, an insulator 92 covering the peripheral surface of the inner conductor 91, an outer conductor 93 made of a metallic braided wire having a cylindrical shape and covering the peripheral surface of the insulator 92, and a protective sheath 94 covering the peripheral surface of the outer conductor 93 (see FIG. 4A).

In the following, it is assumed that the transverse orientation of the plug connector 10 is the X-axis orientation, the longitudinal orientation of the plug connector 10 is the Y-axis orientation, and the vertical direction orthogonal to these orientations is along a Z-axis orientation. The X-axis positive direction is a direction in which the plug connector 10 is inserted into the receptacle connector 30, and the X-axis negative direction is a direction in which the plug connector 10 is removed from the receptacle connector 30. The X-axis positive direction may be referred to as "forward", and the X-axis negative direction may be referred to as "backward".

Plug Connector

Next, the plug connector 10 will be described in detail with reference to FIGS. 2 to 6. FIG. 4 illustrates a state in which the position of the lock member 50 is moved (rotated).

Figure 2:
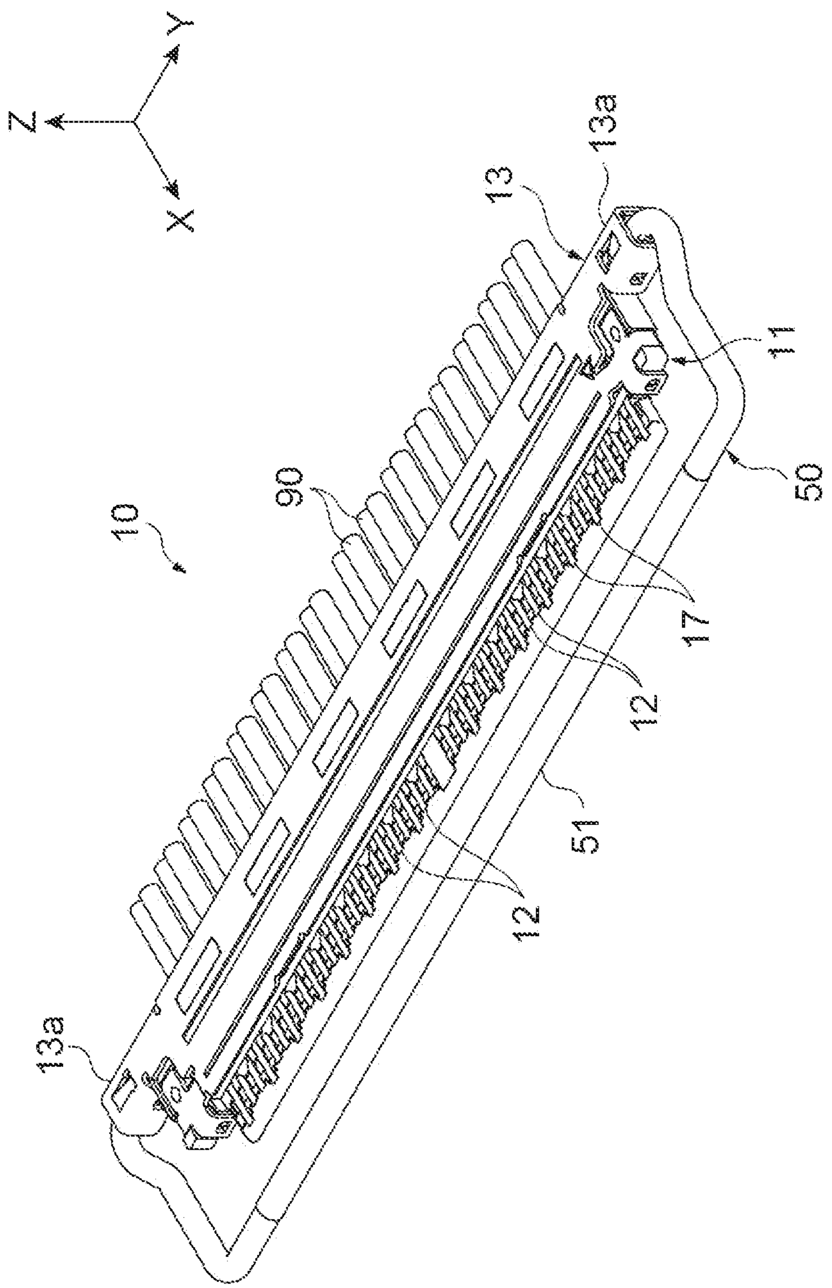
FIG. 2 is a perspective view illustrating an example configuration of a plug connector.
Figure 4B:
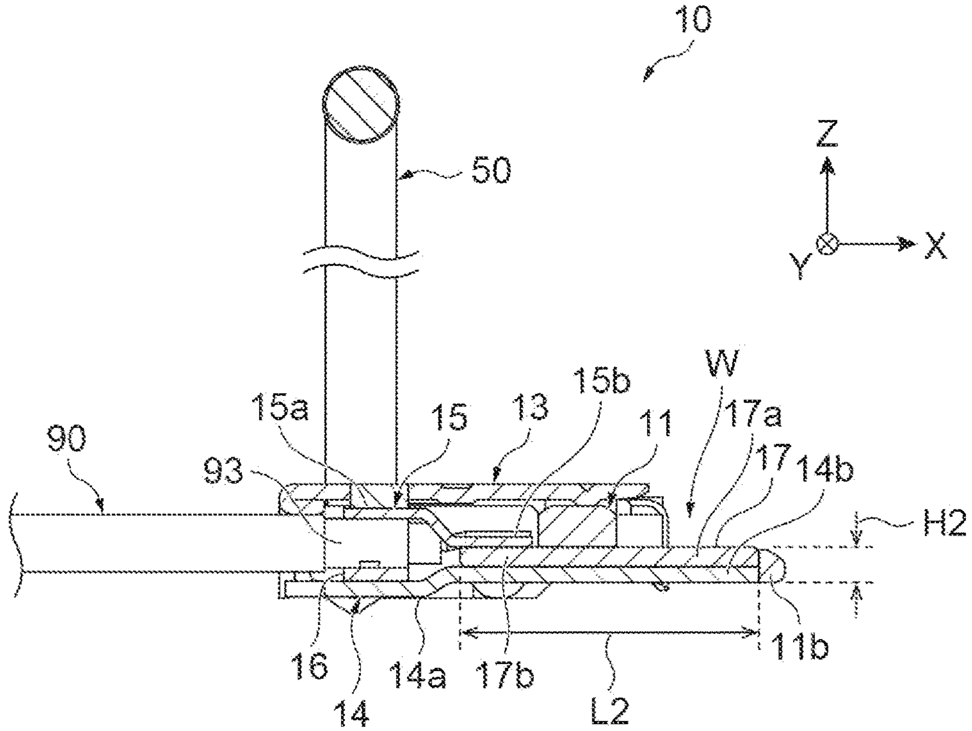
FIG. 4B is a IVB-IVB arrow view thereof.

The plug connector 10 is an elongated connector whose main body portion extends along a predetermined direction (the Y-axis orientation), and is a connector configured to be fitted to the receptacle connector 30 which is a mate connector, and to which the coaxial cables 90 are connected. As illustrated in FIGS. 2, 4A, and 4B, the plug connector 10 includes a housing 11 (an insulating housing), signal contact members 12 (signal contacts), a first shell member 13 (a shell), a second shell member 14 (a shell), a first ground bar 15, a second ground bar 16, and ground contact members 17 (ground contacts).

Figure 3A:
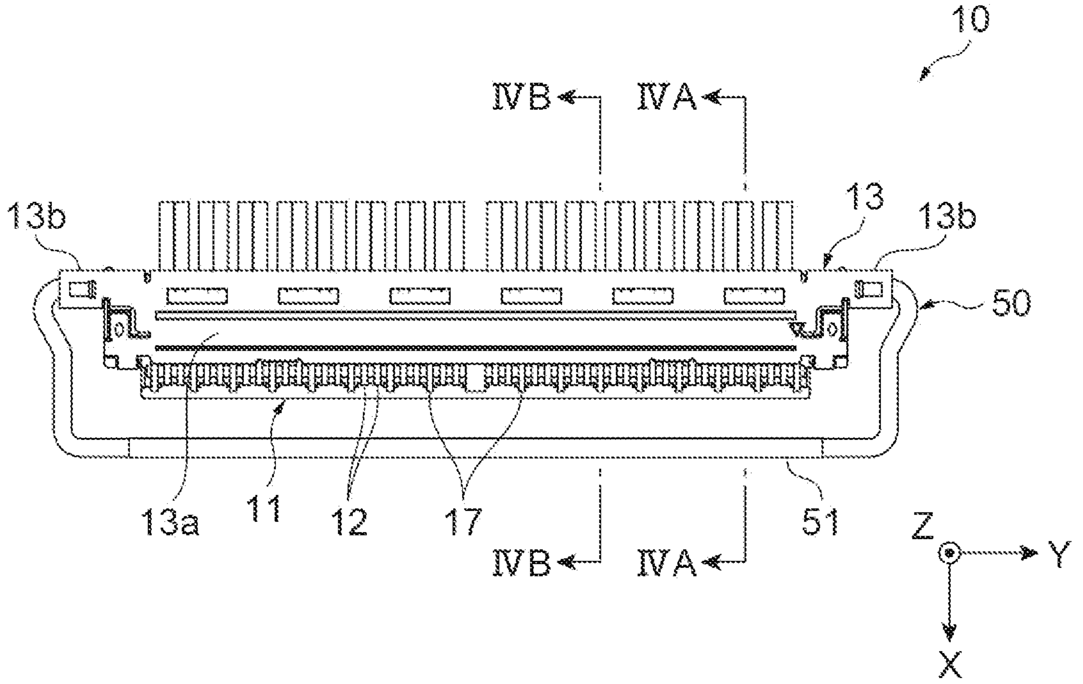
FIG. 3A is a plan view of the plug connector.
Figure 3B:
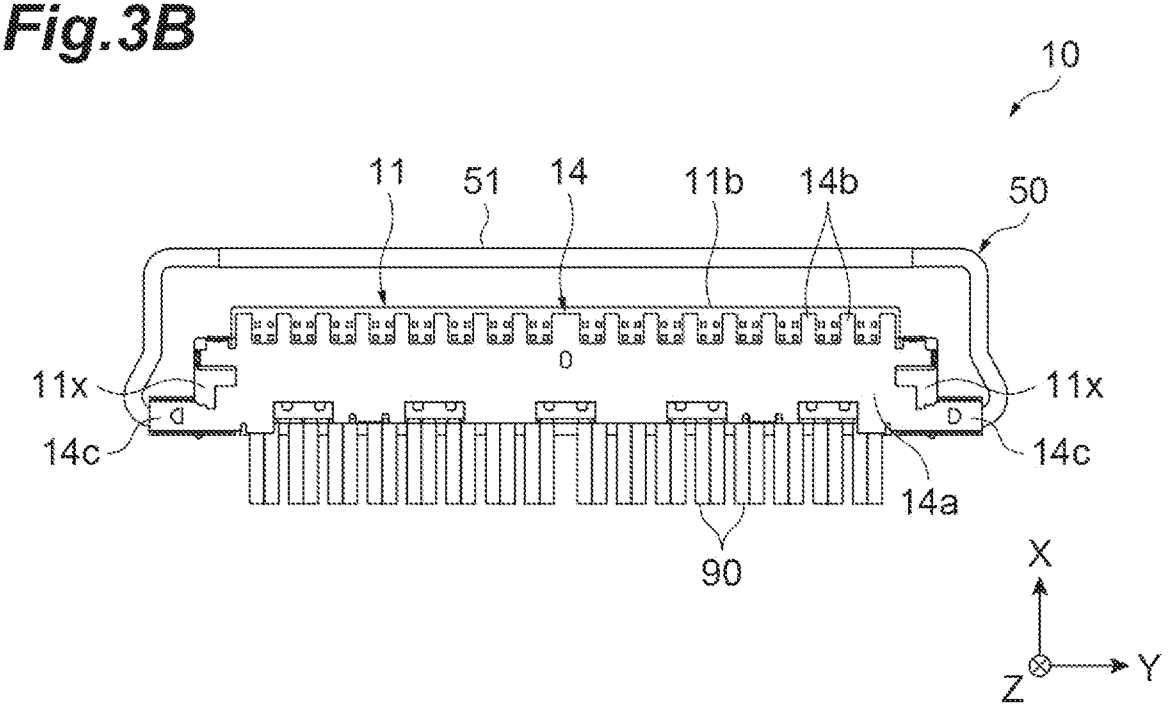
FIG. 3B is a bottom view of the plug connector.

The housing 11 is made of a resin-containing insulating material and holds a plurality of signal contact members 12 and the ground contact members 17. As illustrated in FIGS. 2, 3A, and 3B, for example, the housing 11 includes a main body 11*a* and a tip portion 11*b*. The main body 11*a* extends along the Y-axis orientation and supports the coaxial cable 90 with the main portion located facing the tip of the inner conductor 91 of the coaxial cable 90.

Projecting portions 11*x* protruding outward in the Y-axis orientation are provided at both ends of the main body 11*a* (see FIGS. 3A and 3B). For example, as illustrated in FIG. 3B, the projecting portions 11*x* function as a portion that supports the lock member 50 attached to the plug connector 10 together with supporting portions 13*b* and supporting portions 14*c* described below.

Figure 8A:
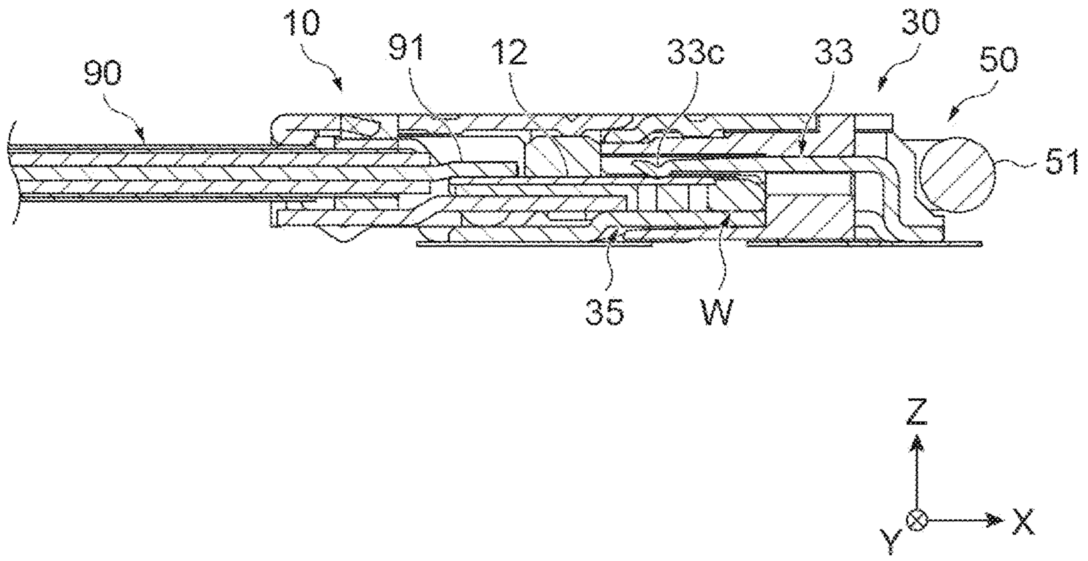
FIGS. 8A and 8B are diagrams illustrating the fitted state of the receptacle connector and the plug connector, and correspond to FIGS. 4A and 4B, respectively.
Figure 8B:
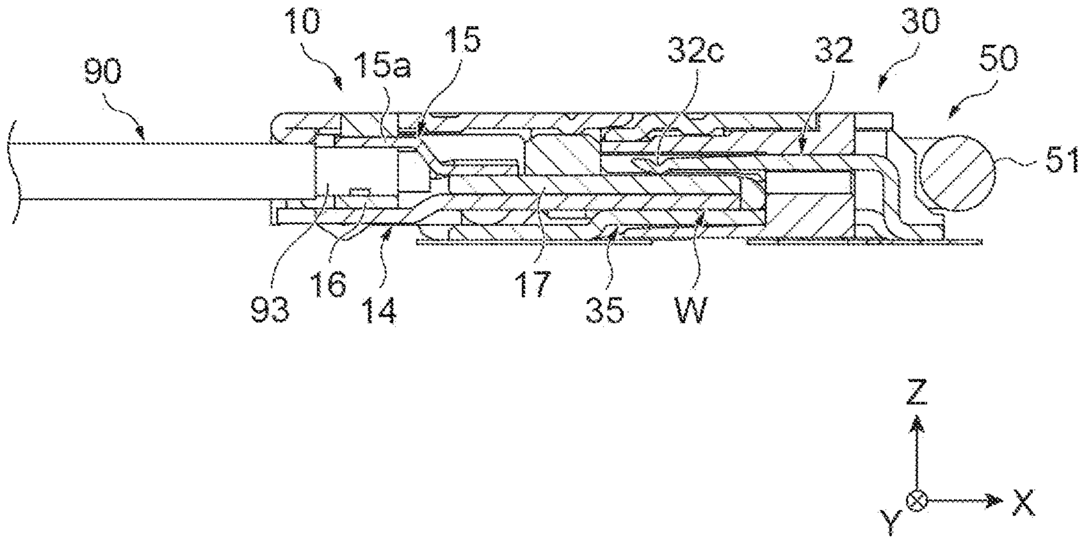

The tip portion 11*b* protrudes in the X-axis orientation from one end of the main body 11*a* (the end opposite to the end where the coaxial cable 90 was inserted). The tip portion 11*b* holds the signal contact member 12 and the ground contact members 17 extending in the X-axis orientation. The tip portion 11*b*, together with the signal contact members 12 and the ground contact members 17, also constitute a protrusion W in the plug connector 10. Therefore, the thickness of the tip portion 11*b* (the length in the Z-axis orientation) corresponds to the height of a recess V of the receptacle connector 30 (the length in the Z-axis orientation) described later. As illustrated in FIG. 8, in a state in which the plug connector 10 is fitted with the receptacle connector 30, the signal contact members 12 attached to the tip portion 11*b* of the plug connector 10 and signal contact members 33 exposed from the recess V of the receptacle connector 30 come into contact with each other, thereby forming a part of a signal circuit, for example.

The first shell member 13 is provided above the housing 11 as illustrated in FIG. 3A. As illustrated in FIG. 3B, the second shell member 14 is provided below the housing 11. The housing 11 and the second shell member 14 may be integrally formed.

The signal contact member 12 is attached to the upper surface of the tip portion 11*b* of the housing 11. The signal contact member 12 is provided so that a pair of signal contact members 12 is exposed along the longitudinal orientation (Y-axis orientation) of the plug connector 10 in a form corresponding to a pair of coaxial cables 90. A pair of signal contact members 12 is two signal contact members 12 placed side-by-side in the longitudinal orientation of the plug connector 10.

The pair of signal contact members 12 is arranged in the longitudinal orientation (Y-axis orientation) of the plug connector 10 at a predetermined interval set in advance along the longitudinal orientation of the plug connector 10, similarly to the pair of coaxial cables 90.

The signal contact members 12 are formed of a conductive metallic member. The signal contact members 12 are formed along the transverse orientation (the X-axis orientation) of the plug connector 10 from the main body 11*a* to the tip portion 11*b* of the housing 11.

The signal contact member 12 contacts and electrically connects to the inner conductor 91 of the coaxial cable 90, as illustrated in FIG. 4A. As illustrated in FIG. 8A, the signal contact member 12 comes into contact with the signal contact member 33 of the receptacle connector 30 when fitted and is electrically connected thereto. For example, the signal contact member 12 functions as a contact contacting portion. For example, the signal contact member 12 includes a contacting portion 12*a* configured to contact the signal contact member 33 of the receptacle connector 30, and a connecting portion 12*b* configured to be connected to the inner conductor 91 (the signal conductor).

The first shell member 13 is formed of a conductive metallic member, and is mounted so as to cover the upper side of the housing 11 as illustrated in FIG. 3A, FIG. 4A, and the like. The first shell member 13 includes an upper wall 13*a* and the supporting portions 13*b* at both ends of the longitudinal orientation of the plug connector 10 (Y-axis orientation) as illustrated in FIGS. 2 and 3A. The supporting portions 13*b* has a substantially U-shape whose lower side is open. The supporting portion 13*b* is formed so as to cover the supporting portions 14*c* of the second shell member 14, which is a shaft holder of the lock member 50 described later.

As illustrated in FIGS. 4A and 4B, the upper wall 13*a* is in contact with the first ground bar 15 behind the housing 11 and is electrically connected to the outer conductor 93 of the coaxial cable 90 via the first ground bar 15. In this way, the first shell member 13 is electrically connected to the outer conductor 93 of the coaxial cable 90.

The second shell member 14 is formed of a conductive metallic member, and is formed integrally with the housing 11 as illustrated in FIGS. 3B and 4B. As illustrated in FIG. 3B, the second shell member 14 includes a lower wall 14*a*, ground contact supporting portions 14*b*, and the supporting portions 14*c*.

The lower wall 14*a* of the second shell member 14 is exposed on the lower surface of the housing 11 as illustrated in FIGS. 3B and 4B. When fitted with the receptacle connector 30, the lower wall 14*a* is in contact with a second shell member 35 of the receptacle connector 30 and electrically connected to the second shell member 35 of the receptacle connector 30.

As illustrated in FIGS. 4A and 4B, the lower wall 14*a* is in contact with the second ground bar 16 behind the housing 11 and is electrically connected to the outer conductor 93 of the coaxial cable 90 via the second ground bar 16. In this way, the second shell member 14 is electrically connected to the outer conductor 93 of the coaxial cable 90.

The ground contact supporting portions 14*b* are formed to extend from the lower wall 14*a* toward a transverse orientation (the X-axis orientation) of the plug connector 10. The ground contact supporting portions 14*b* are placed at predetermined intervals along the longitudinal orientation of the plug connector 10. The ground contact supporting portions 14*b* are disposed between a pair of adjacent signal contact members 12 so as to extend in the same orientation (the X-axis orientation) as the signal contact member 12. The ground contact supporting portions 14*b* may be in contact with the ground contact members 17 and, for example, ultrasonically connected or soldered. Thus, the ground contact supporting portions 14*b* are electrically connected to ground fingers 15*b*.

By electrically connecting the second shell member 14 and the ground contact members 17 in advance before integrally forming the second shell member 14 and the ground contact members 17 with the housing 11, a reliable connection can be achieved.

The first shell member 13 and the second shell member 14 are attached as seal members that cover a signal transmission path formed inside the plug connector 10 from the outside to perform electromagnetic shielding.

As illustrated in FIGS. 2 and 3B, the supporting portions 14*c* are provided so as to protrude further from the lower wall 14*a* in the longitudinal orientation (Y-axis orientation) of the plug connector 10. The supporting portions 14*c* are formed in a substantially U-shape whose upper side is open. The supporting portions 14*c* function as a shaft holder that rotatably supports the lock member 50. The first shell member 13 and the second shell member 14 are electrically connected by contact between the upper wall 13*a* of the first shell member 13 and a portion of the lower wall 14*a* as well as the supporting portion 13*b* and the supporting portion 14*c* with the second shell member 14.

Figure 5A:
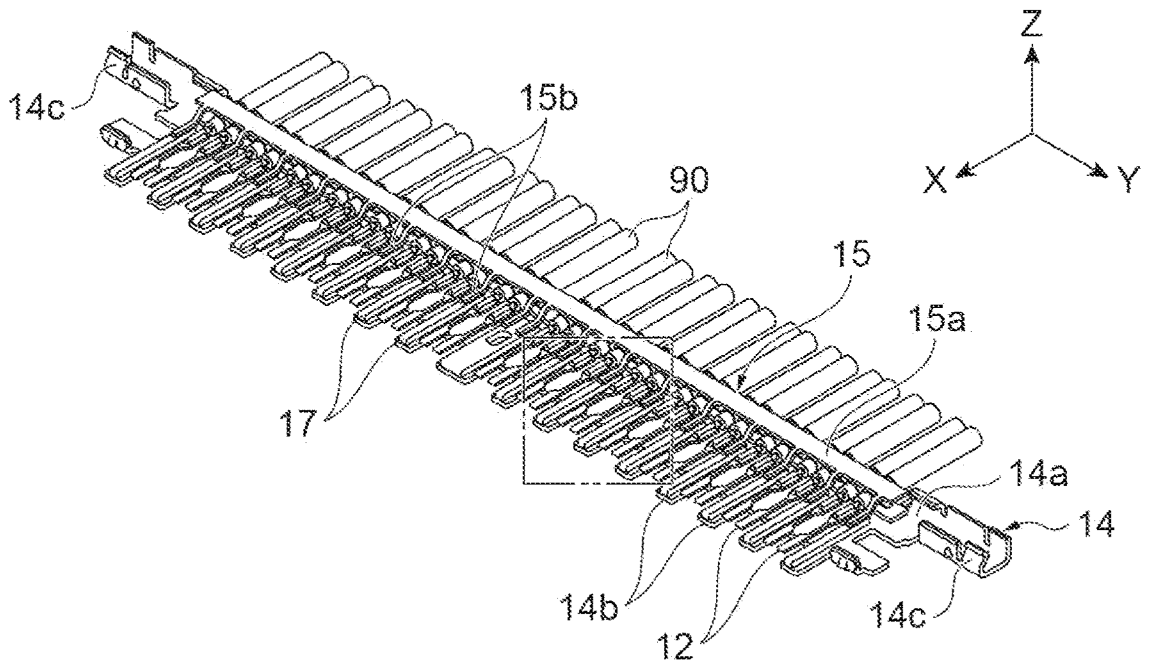
FIG. 5A is a perspective view illustrating a part of the plug connector.
Figure 5B:
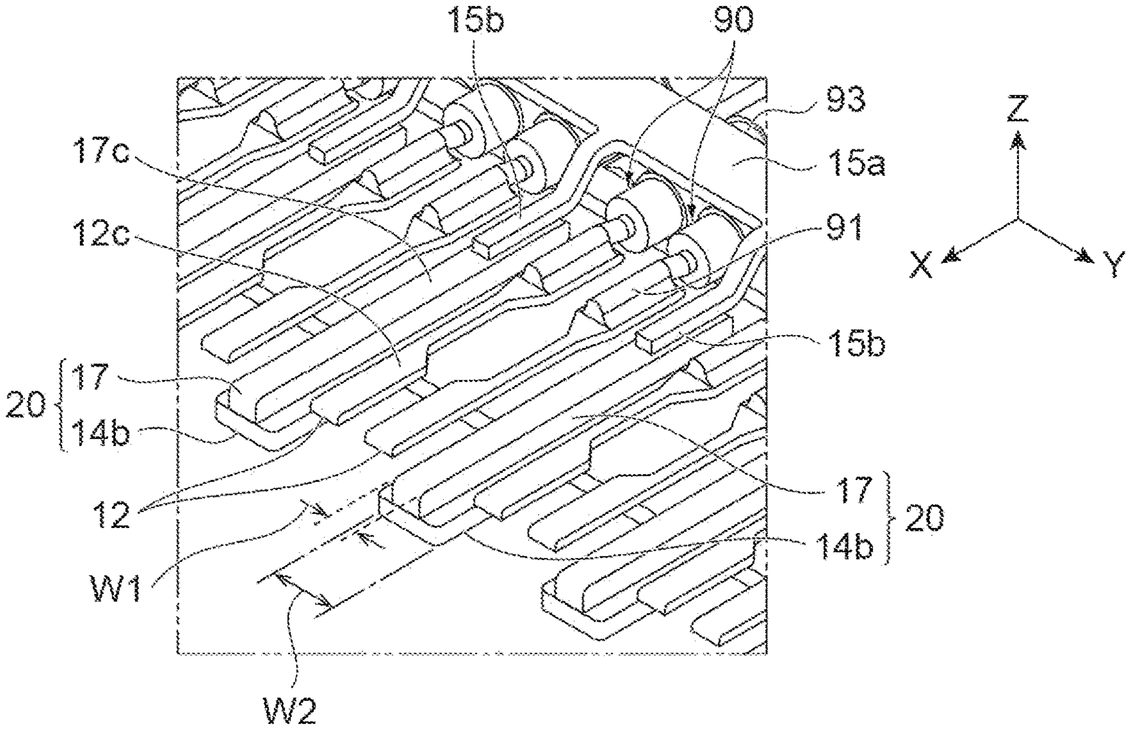
FIG. 5B is an enlarged view of a part of FIG. 5A.

The first ground bar 15 is formed of a conductive metallic member, and includes a main body 15*a* and the ground fingers 15*b* as illustrated in FIGS. 4B, 5A, and 5B. As illustrated in FIG. 5A, the main body 15*a* of the first ground bar 15 is formed so as to extend along the longitudinal orientation (the Y-axis orientation) of the plug connector 10. The main body 15*a* is in contact with the outer conductors 93 of a plurality of coaxial cables 90 arranged along the longitudinal orientation of the plug connector 10 and is electrically connected to the outer conductors 93 of a plurality of coaxial cables 90. That is, the first ground bar 15 is electrically connected to the outer conductors 93 of the plurality of coaxial cables 90.

As illustrated in FIGS. 4B, 5A, and 5B, the ground fingers 15*b* protrude forward from the front end of the main body 15*a*. In addition, the ground fingers 15*b* protrude obliquely downward. The front ends of the ground fingers 15*b* are soldered to the ground contact members 17 to be described later. Thus, the ground fingers 15*b* are electrically connected to the ground contact members 17. Thus, in the plug connector 10, the first ground bar 15 and the ground contact members 17 function as ground contacts connected to the outer conductors 93 of the coaxial cables 90. The first ground bar 15 functions as a ground connecting portion, and the ground contact members 17 function as a ground contacting portion. The ground contact member 17 includes a ground contacting portion 17*a* configured to contact the ground contact member 32 of the receptacle connector 30, and a ground connecting portion 17*b* configured to be connected to the outer conductors 93 via the ground bar 15. The ground contact member 17 penetrates the housing 11 to contact the ground contact supporting portions 14*b* (projecting portion).

The connection between the outer conductors 93 of the coaxial cables 90 and the ground contact members 17 may be performed without the first ground bar 15, for example, by extending a shield line from the outer conductors and directly electrically connecting to the ground contact members 17.

The second ground bar 16 is formed of a conductive metallic member. Similarly to the first ground bar 15, it is formed to extend along the longitudinal orientation (the Y-axis orientation) of the plug connector 10. The second ground bar 16 is in contact with the outer conductors 93 of a plurality of coaxial cables 90 arranged along the longitudinal orientation of the plug connector 10 and is electrically connected to the outer conductors 93 of the plurality of the coaxial cable 90. The second ground bar 16 is in contact with the lower wall 14*a* of the second shell member 14 and is electrically connected to the lower wall 14*a*.

The ground contact members 17 are elongated members formed of a conductive metallic member and extending in a transverse orientation (the X-axis orientation) of the plug connector 10. The ground contact members 17 are attached to the upper surface of the ground contact supporting portions 14*b*. The ground contact members 17 are placed at predetermined intervals in the longitudinal orientation of the plug connector 10, corresponding to the ground contact supporting portions 14*b*. As illustrated in FIG. 5B, the ground contact member 17 has a square pole shape having a rectangular cross section, but the cross-sectional shape is not particularly limited. The signal contact member 12 includes a signal contact surface 12*c* facing away from the shell 14. The ground contact member 17 includes a ground contact surface 17*c* facing away from the shell 14. The signal contact surface 12*c* and the ground contact surface 17*c* are substantially flush with each other.

As described above, the ground contact members 17 are soldered and electrically connected to the ground fingers 15*b*. The ground contact members 17 are also soldered and electrically connected to the ground contact supporting portions 14*b* by soldering or the like. For example, as illustrated in FIGS. 4B and 5B, a state in which the entire lower surfaces of the ground contact members 17 are in contact with the ground contact supporting portions 14*b* is realized, and both are electrically connected.

As illustrated in FIG. 2 and the like, the lock member 50 is formed in a substantially U-shape and is rotatably supported by the supporting portions 14*c* of the second shell member 14. The lock member 50 is formed of, for example, a metallic rod-shaped member (a round rod member), and has elasticity and conductivity. As described above, since the supporting portions 14*c* supporting both ends of the lock member 50 function as the shaft holder, the lock member 50 is rotatable about an axial center extending along the Y-axis orientation. The lock member 50 includes, in a central part, an arm portion 51 extending along the longitudinal orientation (the Y-axis orientation) of the plug connector 10. The arm portion 51 moves to rotate about the axial center extending in the longitudinal orientation (the Y-axis orientation) of the plug connector 10 as the lock member 50 rotates.

Structures around Signal Contact Member and Ground Contact Member

With reference to FIGS. 5A and 5B, structures around the signal contact member 12 and the ground contact member 17 will be further described.

As illustrated in FIG. 5B, a plurality of pairs of the signal contact members 12 connected to a pair of coaxial cables 90 are arranged along the longitudinal orientation (the Y-axis orientation) of the plug connector 10. The ground contact member 17 is arranged between adjacent pairs of the signal contact members 12. As described above, the pair of signal contact members 12 and the ground contact member 17 are alternately arranged along the longitudinal orientation (the Y-axis orientation) of the plug connector 10.

The ground contact members 17 are fixed relative to the ground contact supporting portions 14*b* of the second shell member 14. Accordingly, the ground contact members 17 and the ground contact supporting portions 14*b* form walls 20 that separate a pair of adjacent signal contact members 12.

Since both the ground contact members 17 and the ground contact supporting portions 14*b* (the second shell member 14) are conductive members, the above-described walls 20 are conductive. Further, since the ground contact members 17 and the ground contact supporting portions 14*b* are fixed in contact with each other and electrically connected to each other, they have the same electric potential. In addition, in a state where the plug connector 10 and the receptacle connector 30 are fitted to each other, the ground contact members 17 and the ground contact supporting portions 14*b* have the ground potential. Accordingly, the wall 20 can exert a function of suppressing crosstalk between a pair of adjacent signal contact members 12.

For downsizing a connector for a device such as the connector device 1, since the signal contact members 12 are also disposed relatively close to each other, crosstalk may occur and signal transfer quality may be degraded. In particular, since the electric signal propagates in a state where each the signal contact member 12 is not covered with a sheath or the like, the possibility of occurrence of crosstalk increases. In such a situation, if a conductive the wall 20 is provided between adjacent pairs of the signal contact members 12, the wall 20 may function as a shield to suppress crosstalk.

By adjusting the shape and arrangement of the wall 20, the effect of suppressing crosstalk by the wall 20 can be further enhanced.

As an example, the wall 20 along the direction in which the coaxial cable 90 extends may be longer than or equal to the signal contact member 12. In the example plug connector 10, as illustrated in FIG. 4A, when the length of the signal contact member 12 is defined as L1 and the length of the wall 20 (here, the length of the ground contact member 17) is defined as L2, there is a relationship of L2>L1. By setting L1 and L2 to have a relationship of L2>L1, a signal may be prevented from linearly propagating in the longitudinal orientation (the Y-axis orientation) of the plug connector 10, and thus the occurrence of crosstalk may be suppressed.

Also, the wall 20 may be larger than the signal contact member 12 in an orientation intersecting the extending orientation of the coaxial cable 90 (the X-axis orientation) when viewed from the arrangement orientation of the plurality of pairs of signal contacts, that is, the longitudinal orientation of the plug connector 10 (the Y-axis orientation). In the example plug connector 10, as illustrated in FIG. 4B, when the height of the signal contact member 12 in the vertical direction (the Z-axis orientation) is defined as H1 and the height of the wall 20 (the sum of the lengths of the ground contact member 17 and the ground contact supporting portion 14*b*) is defined as H2, There is a relationship of H2>H1. By setting H1 and H2 to have a relationship of H2>H1, propagation of a signal of the plug connector 10 longitudinal orientation (the Y-axis orientation) is further prevented, and thus occurrence of crosstalk can be suppressed.

As described above, by adjusting the relationship between L1 and L2 or the relationship between H1 and H2, the wall 20 may be arranged so as to overlap the entirety of the signal contact member 12 when viewed from the arrangement orientation of a plurality of pairs of signal contacts, that is, the longitudinal orientation (the Y-axis orientation) of the plug connector 10. Since the leakage of the electric signal in the longitudinal orientation (the Y-axis orientation) of the plug connector 10 is suppressed, the suppression effect of crosstalk is enhanced.

When the ground contact member 17 is provided at a position overlapping with the signal contact member 12 when viewed from the arrangement orientation of the plurality of pairs of signal contacts, that is, the longitudinal orientation (the Y-axis orientation) of the plug connector 10, the width of the shell constituting the wall 20 along the longitudinal orientation (the Y-axis orientation) of the plug connector 10 may be larger than the width of the ground contact member 17 constituting the wall 20. In the example plug connector 10, as illustrated in FIGS. 4A and 4B, when viewed from the longitudinal orientation (the Y-axis orientation) of the plug connector 10, the signal contact member 12 and the ground contact member 17 are provided at overlapping positions. As illustrated in FIG. 5B, when the length (the width) of the ground contact member 17 in the longitudinal orientation (Y-axis orientation) of the plug connector 10 is defined as W1 and the length (the width) of the ground contact supporting portion 14*b* is defined as W2, there is a relationship of W2>W1. By setting W1 and W2 to have a relationship of W2>W1, the path of signal propagation between the pair of signal contacts is made longer, and therefore the possibility of crosstalk occurring can be reduced.

If the ground contact member 17 and the ground contact supporting portion 14*b* (the second shell member 14) are electrically connected by the surface contact on the surface extending along an orientation (the X-axis orientation) in which the coaxial cable 90 extends like the wall 20 in the example plug connector 10, the effect of suppressing the crosstalk by the wall 20 is further enhanced. The term "surface contact" means that a region where the ground contact member 17 and the ground contact supporting portion 14*b* are in contact with each other is a two-dimensional region in both the width direction (the X-axis) and the longitudinal direction (the Y-axis orientation) of the wall 20. The entirety of the surface facing the ground contact supporting portion 14*b* of the ground contact member 17 is in contact with the ground contact supporting portion 14*b*, and thus can be said to be in "surface contact".

Figure 6A:
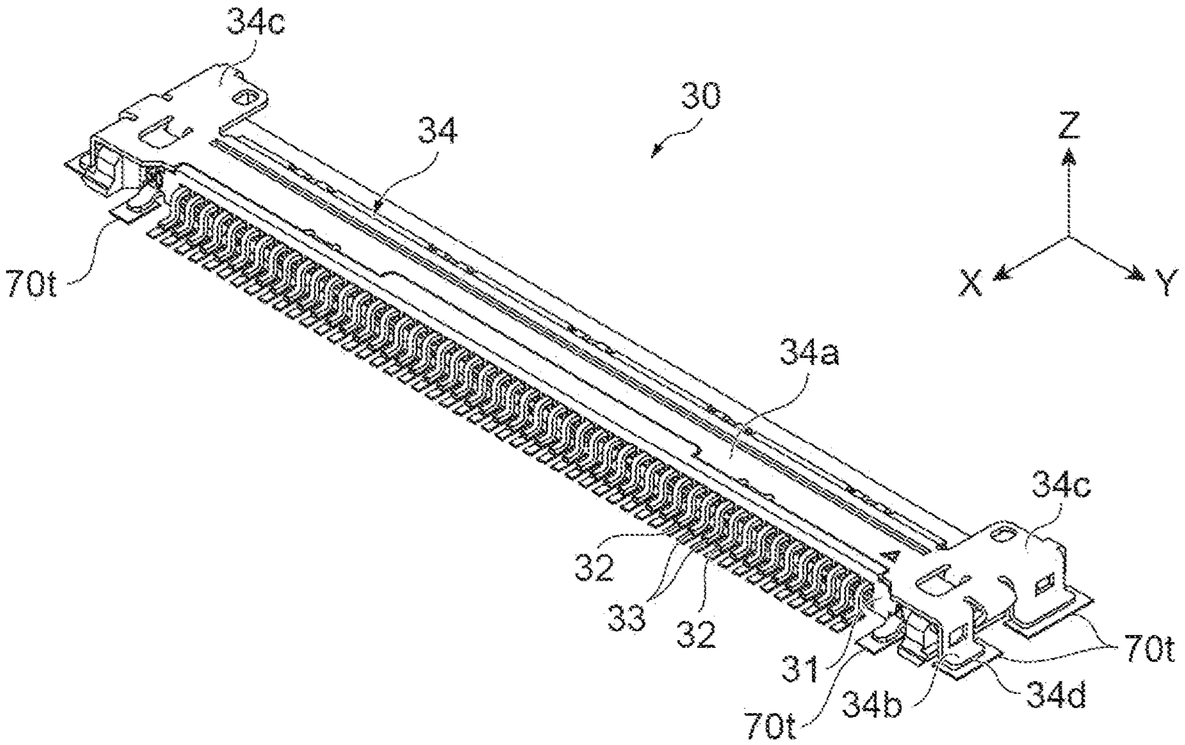
FIGS. 6A and 6B are perspective views of a receptacle connector.
Figure 6B:
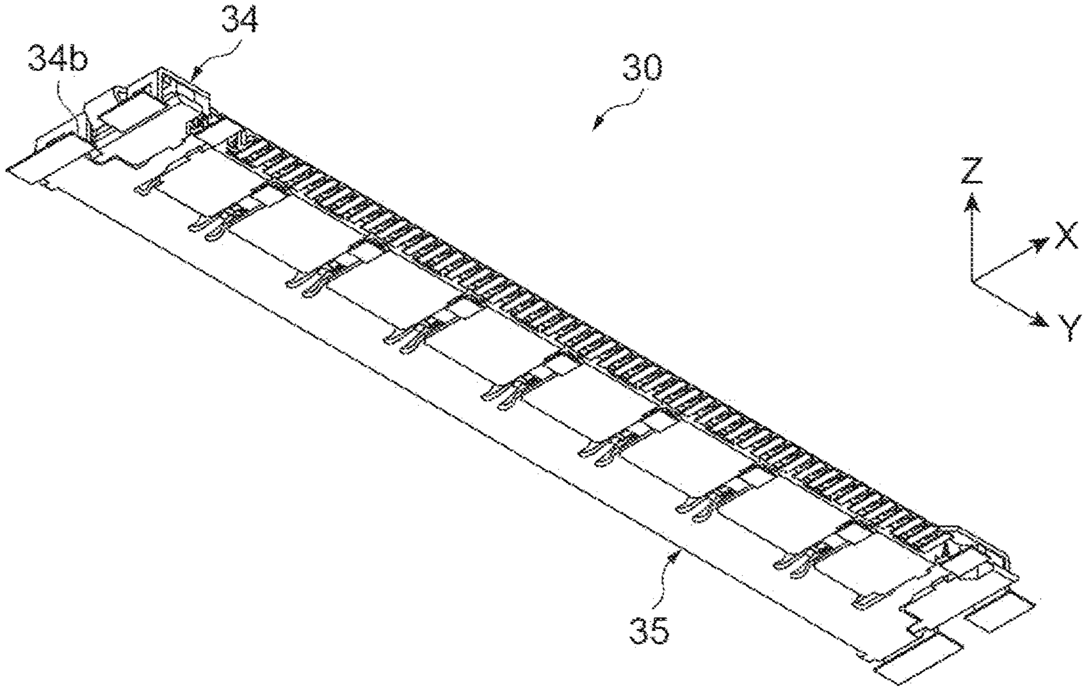

Receptacle Connector The receptacle connector 30 will be described with reference to FIGS. 6A and 6B and FIGS. 7A and 7B. The receptacle connector 30 includes a housing 31, ground contact members 32, the signal contact members 33, a first shell member 34, and the second shell member 35. In FIGS. 6A and 6B, a conductor region 70*t* on the main surface 70*s* of the circuit board 70 is also illustrated.

The housing 31 is made of insulating resin. As illustrated in FIG. 7, the recess V whose rear end is open is formed in the housing 31. The recess V forms a fitting space into which the plug connector 10 is inserted. The recess V is formed to extend along a longitudinal orientation (the Y-axis orientation) of the receptacle connector 30. A part of the fitting space is formed by the second shell member 35.

Figure 7A:
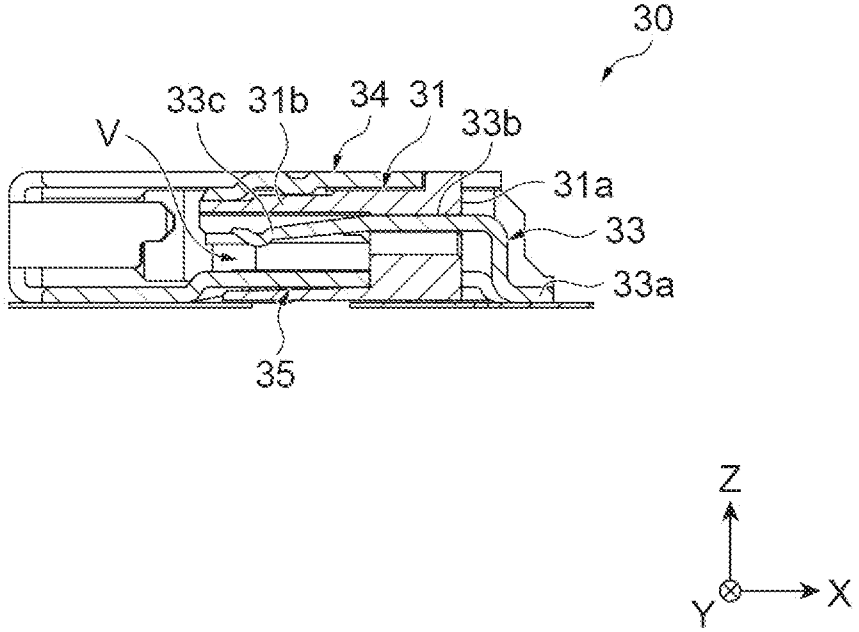
FIGS. 7A and 7B are diagrams illustrating the receptacle connector and correspond to FIGS. 4A and 4B, respectively.
Figure 7B:
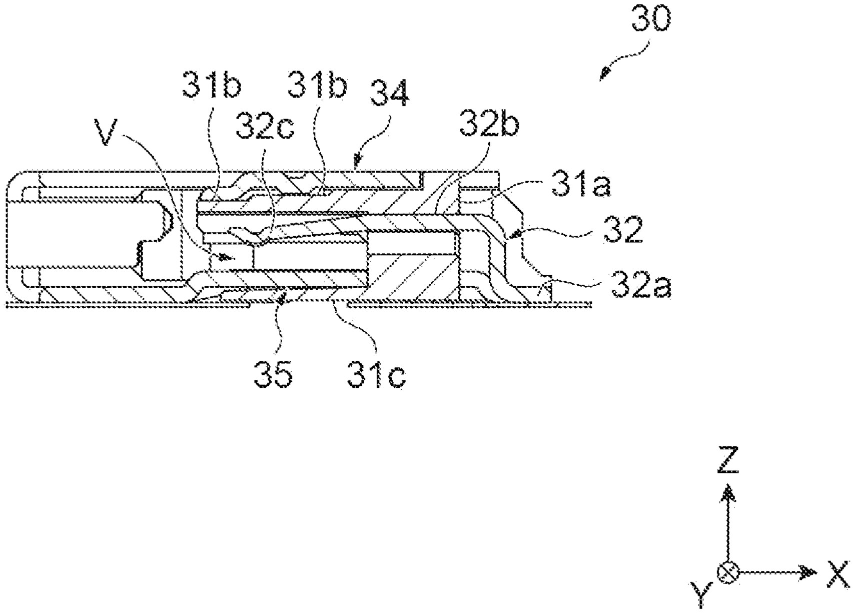

As illustrated in FIGS. 7A and 7B, a plurality of ground contact members 32 and a plurality of signal contact members 33 are press-fitted and attached to a front wall 31*a* of the housing 31. The plurality of ground contact members 32 and the plurality of signal contact members 33 may be formed integrally with the housing 31 by insert molding. The housing 31 is fitted with the ground contact members 32 and a pair of signal contact members 33 alternating along the longitudinal orientation (the Y-axis orientation) of the receptacle connector 30. The first shell member 34 described later comes into contact with an upper wall 31*b* of the housing 31.

The ground contact member 32 is formed of a conductive metallic member. As illustrated in FIG. 7B, the ground contact member 32 includes a proximal end 32*a*, an intermediate portion 32*b*, and a contacting portion 32*c*.

The proximal end 32*a* is placed on the main surface 70*s* of the circuit board 70 and connected to the conductive path of the circuit board 70 by, for example, solder. The proximal end 32*a* protrudes forward (the X-axis positive direction) from the front wall 31*a* of the housing 31 and extends upward from the connecting portion of the circuit board 70.

The intermediate portion 32*b* connects the proximal end 32*a* and the contacting portion 32*c*. The intermediate portion 32*b* extends from the front wall 31*a* of the housing 31 into the recess V and is secured to the housing 31.

The contacting portion 32*c* is the portion that protrudes into the recess V. As illustrated in FIG. 7B, the contacting portion 32*c* comes into contact with the ground contact member 17 of the plug connector 10 described later in the fitted state of the plug connector 10 and the receptacle connector 30. The leading end portion of the contacting portion 32*c* is curved and configured to be elastically deformable.

As illustrated in FIG. 6A and the like, the signal contact members 33 are arranged in a longitudinal orientation (the Y-axis orientation) of the receptacle connector 30 as a pair of signal contact members 33. The pair of signal contact members 33 is two signal contact members 33 placed side by side in the longitudinal orientation of the receptacle connector 30.

The pair of signal contact members 33 is arranged at positions corresponding to the pair of coaxial cable 90 in the longitudinal orientation (the Y-axis orientation) of the receptacle connector 30. Similarly to the pair of coaxial cables 90, the pair of signal contact members 33 is disposed at a predetermined interval set in advance along the longitudinal orientation of the receptacle connector 30.

The signal contact member 33 includes a proximal end 33*a*, an intermediate portion 33*b*, and a contacting portion 33*c*. The example shape of the signal contact member 33 is the same as that of the ground contact member 32, and a detailed description thereof will be omitted. The signal contact member 33 makes electrical contact with the signal contact member 12 of the plug connector 10 (see FIG. 4A) to form a signal transmission path.

The first shell member 34 is formed by, for example, press working an electrically conductive thin plate-shaped metallic member. As illustrated in FIG. 6A, the first shell member 34 includes an upper wall 34*a* and side walls 34*b*.

The upper wall 34*a* is formed along the upper wall 31*b* of the housing 31. The upper wall 34*a* is formed with protruding portions 34*c* protruding forward from both ends of the receptacle connector 30 in the longitudinal orientation (the Y-axis positive and negative directions).

The side walls 34*b* are formed downward from both ends of the upper wall 34*a* in the longitudinal orientation (the Y-axis orientation) of the receptacle connector 30. A bonding portion 34*d* along the main surface of the board is formed at the lower end of the side wall 34*b*. The bonding portion 34*d* is a portion connected to a conductive path for ground connection formed on the circuit board 70. The connection is made by solder bonding, for example. Thus, the ground circuit is electrically connected, and the receptacle connector 30 is fixed to the board.

The second shell member 35 is formed by, for example, press working an electrically conductive thin plate-shaped metallic member. As illustrated in FIGS. 6B, 7A, and 7B, the front end of the second shell member 35 is disposed so as to overlap a lower wall 31*c* of the housing 31. The second shell member 35 is supported from below by the lower wall 31*c* of the housing 31 and is formed along the lower wall 31*c*. The second shell member 35 is formed to extend further backward than a lower wall 31*c* of the housing 31. The second shell member 35 forms a fitting space together with the housing 31.

The first shell member 34 and the second shell member 35 are mounted as shield members that perform electromagnetic shielding by covering a signal transmission path formed inside the receptacle connector 30 from the outside.

Fitted State

Next, the fitted state of the plug connector 10 and the receptacle connector 30 will be described with reference to FIG. 8. When the plug connector 10 fits into the receptacle connector 30, as illustrated in FIG. 8, the protrusion W of the plug connector 10 is accommodated in the recess V of the receptacle connector 30.

In the fitted state, as illustrated in FIG. 8, the signal contact members are electrically connected to each other by a contacting portion 33*c* of the signal contact member 33 of the receptacle connector 30 coining into contact with the signal contact member 12 of the plug connector 10. Further, the ground contact members are electrically connected to each other by the contacting portion 32*c* of the ground contact member 32 of the receptacle connector 30 coining into contact with the ground contact member 17 of the plug connector 10.

Regarding the second shell member 14 of the plug connector 10, the lower wall 14*a* comes in contact with the second shell member 35 of the receptacle connector 30. Thus, the second shell member 14 of the plug connector 10 and the second shell member 35 of the receptacle connector 30 are connected to ground. In the plug connector 10, since the second shell member 14 is electrically connected to the ground contact member 17, ground connection is also made for the ground contact members of the plug connector 10 and the receptacle connector 30.

In the fitted state, as illustrated in FIGS. 1 and 8, the lock member 50 rotates along the axial center extending in the longitudinal orientation (the Y-axis orientation) of the plug connector 10, and the receptacle connector 30 in the fitted state fitted to the plug connector 10 is disposed between the arm portion 51 and the plug connector 10.

Function

In the above-described the plug connector 10, the wall 20 is formed between a pair of adjacent signal contact members 12 by a ground contact and a shell electrically connected to each other, in particular, by the ground contact member 17 and the ground contact supporting portion 14*b* of the second shell member 14. As described above, since the ground contact member 17 itself is used as the wall 20 for suppressing crosstalk, the wall 20 can readily be arranged between a plurality of arranged signal contact members 12. Further, since the wall 20 is formed by the ground contact member 17 connected to the outer conductor 93 of the coaxial cable 90 via the first ground bar 15 and the second shell member 14 set to the same electric potential by the connection to the ground contact member 17, the electric potential of the wall 20 is set to the ground potential. Since the pairs of the signal contact members 12 are separated by the wall 20, crosstalk is suppressed, and deterioration in signal transfer quality can be prevented.

The length L2 of the wall 20 along a direction in which the coaxial cable 90 extends may be greater than or equal to the length L1 of the signal contact member 12. The wall 20 may be disposed to overlap the entirety of the signal contact member 12 when viewed from an arrangement orientation of the plurality of pairs of signal contact members 12. With such a configuration, at any position along the direction in which the coaxial cable 90 extends, the signal contact members 12 constituting different pairs are separated by the wall 20. Accordingly, crosstalk may further be suppressed and deterioration of signal transmission quality may be prevented.

The wall 20 may be larger than the signal contact member 12 in an orientation intersecting the direction in which the coaxial cable 90 extends when viewed from an arrangement orientation of the plurality of pairs of the signal contact members 12. With such a configuration, at any position along the orientation intersecting the direction in which the coaxial cable 90 extends, the signal contact members 12 constituting different pairs are separated by the wall 20. Accordingly, crosstalk may further be suppressed and deterioration of signal transmission quality may be suppressed.

The ground contact and the shell constituting the wall 20, that is, the ground contact member 17 and the ground contact supporting portion 14*b* of the second shell member 14 may be electrically connected by a surface contact on a surface extending along a direction in which the coaxial cable 90 extends. With this configuration, the ground contact and the shell are connected in a planar manner, so that the electric potentials of the ground contact and the shell can be made equal to each other. In addition, at the wall 20, since the contact surface of the ground contact and the shell are formed, a region in which the wall 20 is not formed between the signal contact members 12 constituting different pairs with each other may be reduced. Accordingly, crosstalk may further be suppressed and deterioration of signal transmission quality may be prevented.

The ground contact member 17 may be provided at a position at least partially overlapping with the signal contact member 12 when viewed from the arrangement orientation of the plurality of pairs of the signal contact members 12, and a width of the shell constituting the wall 20 along the arrangement orientation of the plurality of pairs of the signal contact member 12, that is, a width of the ground contact supporting portion 14*b* of the second shell member 14 may be greater than a width of the ground contact member 17 constituting the wall 20. With such a configuration, the signal contact members 12 constituting different pairs are separated by the ground contact member 17. In addition, since the ground contact supporting portion 14*b* having a width larger than that of the ground contact member 17 constitutes the wall 20, wraparound of the signal can be prevented. Accordingly, the occurrence of crosstalk is further suppressed.

The second shell member 14 including the ground contact supporting portion 14*b* may be electrically connected to the second shell member 35, which is the shell of the mate connector, on a surface of the pair of main surfaces, the surface facing away from the surface electrically connected to the ground contact member 17, that is, the lower wall 14*a*. With such a configuration, since the second shell member 14 is electrically connected to the shell (here, the second shell member 35) of the mate connector, both can be set to the ground potential. With such a configuration, degradation of signal transmission quality due to formation of an unexpected potential difference around a conductor transmitting a signal may be prevented.

In the plug connector 10, the ground contact member 17, shell (the second shell member 14), and the signal contact member 12 may be integrally provided by the housing 11. In such a configuration, the positional relationship among the ground contact member 17, the second shell member 14, and the signal contact member 12 can be maintained in the housing 11.

Modification

The configuration and shape of each part of the connector device 1 including the plug connector 10 described above are not particularly limited, and various modifications can be made. For example, in the above-described the plug connector 10 and the receptacle connector 30, an example in which the shell is constituted by two shell members (the first shell member and the second shell member) has been described, but the shell may be constituted by one member or may be constituted by combining a plurality of members as described above.

Further, the shape of the wall 20 may be modified. For example, the relationship between the lengths (L1, L2) and the heights (H1, H2) of the wall 20 and the signal contact member 12 is not limited to the above-described relationship. Further, the relationship of width between the ground contact member 17 and the ground contact supporting portion 14*b* (W1, W1) is not limited to the above-described relationship.

In the above example, the case where the ground contact configuring the wall 20 is the ground contact member 17 and the shell is the ground contact supporting portion 14*b* of the second shell member 14 has been described, but the shell may perform a part of the function as the ground contact. The ground contact forming the wall 20 may be formed by the shell.

Figure 9:
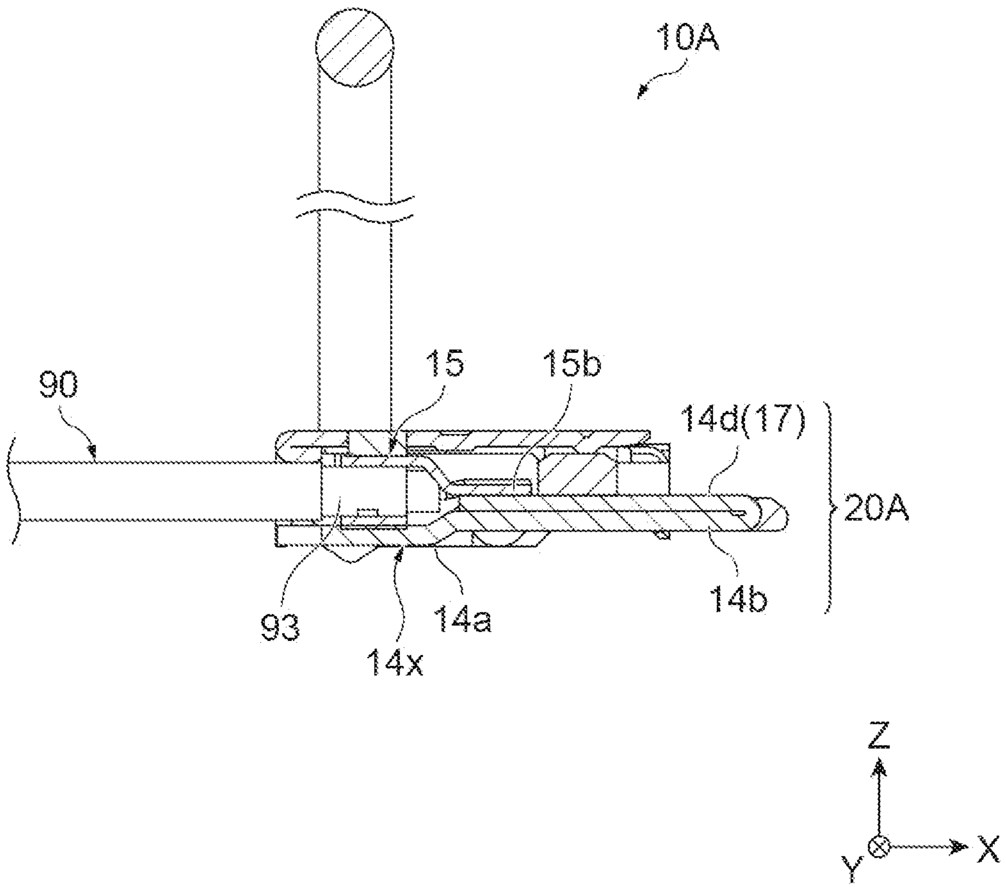
FIG. 9 is a cross-sectional view illustrating an example of a connector according to a modification.

FIG. 9 illustrates an example of a plug connector 10A according to the above modification. In the plug connector 10A, of the second shell member 14*x*, the ground contact supporting portion 14*b* formed iso as to extend from the lower wall 14*a* to the transverse orientation (the X-axis orientation) of the plug connector 10 includes a folded portion 14*d* folded back at its tip. The folded portion 14*d* extends toward the lower wall 14*a* along the transverse orientation (the X-axis orientation) of the plug connector 10 while superimposed on the ground contact supporting portion 14*b*. The folded portion 14*d* has substantially the same shape as the ground contact member 17 illustrated in FIG. 4B, and can be joined to the ground finger 15*b* of the first ground bar 15 at the end. Thus, the folded portion 14*d* functions as the ground contact member 17. Further, in the fitted state with the receptacle connector 30, the folded portion 14*d* may come into contact with the contacting portion 32*c* of the ground contact member 32 of the receptacle connector 30. Thus, in the plug connector 10A, the first ground bar 15 and the folded portion 14*d* may function as ground contacts.

In the plug connector 10A, a wall 20A is composed of the folded portion 14*d* that functions as part of ground contact and the ground contact supporting portion 14*b*. As described above, the wall 20A may be configured by a combination of at least the member functioning as the ground contact and the member functioning as the shell, and the configuration thereof may be modified. For example, the wall 20A may be constituted by one member (the second shell member 14*x*) as described above.

REFERENCE SIGNS LIST

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A connector comprising:

a plurality of signal contacts aligned along an arrangement orientation, each of the plurality of signal contacts extending along an extending orientation crossing the arrangement orientation and comprising:

a connecting portion configured to be connected to a signal conductor of a coaxial cable; and a contacting portion extending from the connecting portion along the extending orientation and configured to contact a mate signal contact of a mate connector;

a conductive ground contact extending along the extending orientation and comprising:

a ground connecting portion configured to be connected to an outer conductor of the coaxial cable; and a ground contacting portion extending from the ground connecting portion along the extending orientation and configured to contact a mate ground contact of the mate connector;

an insulating housing holding the plurality of signal contacts and the ground contact; and a conductive shell covering at least a portion of the insulating housing around the extending orientation, wherein the shell comprises a projecting portion being in contact with the ground contact, wherein the projecting portion and the ground contact form a wall extending along the extending orientation between two adjacent signal contacts of the plurality of signal contacts, wherein a height of the ground contact along a height orientation orthogonal to the arrangement orientation and the extending orientation is greater than a height of the two adjacent signal contacts along the height orientation, and wherein the ground contact penetrates the housing to contact the projecting portion.

2. The connector according to claim 1, wherein the ground connecting portion is located between connecting portions of the two adjacent signal contacts, wherein the ground contacting portion is located between contacting portions of the two adjacent signal contacts, and wherein the shell is in contact with the ground contact both on the ground connecting portion and the ground contacting portion.

3. The connector according to claim 2, wherein the ground contacting portion extends further than the contacting portions of the two adjacent signal contacts along the extending orientation.

4. The connector according to claim 3, wherein the housing extends further than the contacting portions and the ground contacting portion along the extending orientation.

5. The connector according to claim 1, wherein a length of the ground contact along the extending orientation is equal to or greater than a length of the two adjacent signal contacts along the extending orientation.

6. The connector according to claim 1, wherein each of the two adjacent signal contacts comprises a signal contact surface facing away from the shell, wherein the ground contact comprises a ground contact surface facing away from the shell, and wherein the signal contact surface and the ground contact surface are substantially flush with each other.

7. The connector according to claim 6, wherein the connecting portion and the contacting portion are formed on the signal contact surface, wherein the ground connecting portion and the ground contacting portion are formed on the ground contact surface.

8. The connector according to claim 1, wherein the projecting portion and the shell are in surface contact to form the wall.

9. The connector according to claim 8, wherein the shell further comprises a base portion extending along the arrangement orientation, and wherein the projecting portion projects from the base portion along the extending orientation, and wherein the ground contact is in surface contact with both the projecting portion and the base portion.

10. The connector according to claim 1, wherein a width of the projecting portion along the arrangement orientation is greater than a width of the ground contact along the arrangement orientation.

11. The connector according to claim 1, wherein the shell comprises a shell surface facing away from the housing and configured to contact a mate shell of the mate connector.

12. The connector according to claim 11, wherein the shell surface is configured to contact the mate shell at least in part on the projecting portion.

13. The connector according to claim 1, wherein the ground contact, the shell, and the signal contacts are integrally held by the insulating housing.

14. The connector according to claim 1, comprising a plurality of ground contacts including the ground contact, wherein the plurality of signal contacts include a plurality of pairs of signal contacts, wherein the ground contacts and the plurality of pairs of signal contacts are arranged alternately along the arrangement orientation, wherein the shell comprises a plurality of projecting portions including the projecting portion and respectively corresponding to the plurality of ground contacts, wherein each of the plurality of projecting portions is in contact with a corresponding ground contact of the plurality of ground contacts, and wherein each of the plurality of projecting portions and the corresponding ground contact form the wall extending along the extending orientation between two adjacent pairs of the plurality of pairs.

15. The connector according to claim 14, wherein each of the plurality of ground contacts is in surface contact with a corresponding projecting portion of the plurality of projecting portions.

16. The connector according to claim 15, wherein the shell further comprises a base portion extending along the arrangement orientation, wherein each of the plurality of projecting portions projects from the base portion along the extending orientation, and wherein each of the plurality of ground contacts is in surface contact with both the base portion and the corresponding projecting portion.

17. The connector according to claim 14, further comprising a conductive ground bar comprising:

a main body extending along the arrangement orientation to contact the outer conductor of each of a plurality of coaxial cables respectively corresponding to the plurality of signal contacts; and a plurality of ground fingers respectively corresponding to the plurality of ground contacts, each of the plurality of ground fingers extends from the main body to be connected to a corresponding ground contact of the plurality of ground contacts.

18. The connector according to claim 14, wherein each of the plurality of ground contacts penetrates the housing to contact a corresponding projecting portion of the plurality of projecting portions.

19. A connector comprising:

a plurality of signal contacts aligned along an arrangement orientation, each of the plurality of signal contacts extending along an extending orientation crossing the arrangement orientation and comprising:

a connecting portion configured to be connected to a signal conductor of a coaxial cable; and a contacting portion extending from the connecting portion along the extending orientation and configured to contact a mate signal contact of a mate connector;

a plurality of conductive ground contacts each extending along the extending orientation and comprising:

a ground connecting portion configured to be connected to an outer conductor of the coaxial cable; and a ground contacting portion extending from the ground connecting portion along the extending orientation and configured to contact a mate ground contact of the mate connector;

an insulating housing holding the plurality of signal contacts and the ground contact; and a conductive shell covering at least a portion of the insulating housing around the extending orientation, wherein the plurality of signal contacts include a plurality of pairs of signal contacts, wherein the ground contacts and the plurality of pairs of signal contacts are arranged alternately along the arrangement orientation, wherein the shell comprises a plurality of projecting portions respectively corresponding to the plurality of ground contacts, wherein each of the plurality of projecting portions is in contact with a corresponding ground contact of the plurality of ground contacts, and wherein each of the plurality of projecting portions and the corresponding ground contact form a wall extending along the extending orientation between two adjacent pairs of the plurality of pairs.

20. The connector according to claim 19, wherein each of the plurality of ground contacts is in surface contact with a corresponding projecting portion of the plurality of projecting portions.

* * * * *